(12) United States Patent
Salter et al.

(10) Patent No.: US 10,631,373 B2
(45) Date of Patent: Apr. 21, 2020

(54) HEATED WINDSHIELD INDICATOR

(71) Applicant: Ford Global Technologies, LLC, Dearborn, MI (US)

(72) Inventors: Stuart C. Salter, White Lake, MI (US); Paul Kenneth Dellock, Northville, MI (US); Jennifer Ann Gauthier, Fenton, MI (US); Cornel Lewis Gardner, Romulus, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 699 days.

(21) Appl. No.: 15/153,055

(22) Filed: May 12, 2016

(65) Prior Publication Data

US 2017/0332446 A1    Nov. 16, 2017

(51) Int. Cl.
*H05B 3/84* (2006.01)
*B60K 35/00* (2006.01)
(Continued)

(52) U.S. Cl.
CPC .............. *H05B 3/84* (2013.01); *B60K 35/00* (2013.01); *B60Q 3/20* (2017.02); *B60R 16/0231* (2013.01);
(Continued)

(58) Field of Classification Search
CPC . H05B 3/84; H05B 3/86; H05B 3/845; H05B 1/0236; H05B 2203/031; B60Q 3/20; B60Q 3/208; B60Q 3/258; B60Q 3/0213; B60Q 1/268; B60Q 1/2684; B60Q 1/302; B60Q 1/2696; G02B 27/01; B60K 35/00; B60K 2350/2008; B60K 2350/921; B60R 16/0231; B60R 16/037; B60R 2021/21543; G09F 13/20; F21S 13/02; F21S 41/14; F21S 41/16; F21S 41/285; F21S 43/26; B60J 1/00; B60J 1/008; B60J 1/1012; B60J 1/02; B32B 27/08; B32B 27/20; B32B 17/10036; B32B 17/1074; B32B 17/10; B32B 17/10761; B32B 17/10541; B32B 17/10211; B32B 17/10467; B32B 17/10743; B32B 17/1077; B32B 17/10788; B32B 17/10889; B32B 17/10934; B32B 17/10972; B29C 70/88; Y10T 29/49169; B60S 1/026; B60S 1/04; B60S 1/0411; B60S 1/048; B62D 53/061

See application file for complete search history.

(56) References Cited

U.S. PATENT DOCUMENTS 2,486,859 A    11/1949   Meijer et al.
5,053,930 A    10/1991   Benavides
(Continued)

FOREIGN PATENT DOCUMENTS

CN    101337492 A    1/2009
CN    201169230 Y    2/2009
(Continued)

*Primary Examiner* — Shawntina T Fuqua
(74) *Attorney, Agent, or Firm* — David Coppiellie; Price Heneveld LLP

(57) ABSTRACT

A windshield assembly is provided herein. The windshield assembly includes a windshield having a frit and an indicator thermally coupled to the windshield to visually coincide with the frit and operable to illuminate in order to indicate a relative temperature of the windshield.

20 Claims, 6 Drawing Sheets

(51) Int. Cl.
*G02B 27/01* (2006.01)
*B60Q 3/20* (2017.01)
*B60R 16/023* (2006.01)
*B60J 1/02* (2006.01)

(52) U.S. Cl.
CPC .............. *G02B 27/01* (2013.01); *B60J 1/02* (2013.01); *B60K 2370/188* (2019.05); *B60K 2370/77* (2019.05)

(56) References Cited

U.S. PATENT DOCUMENTS

| | | |
|---|---|---|
| 5,434,013 A | 7/1995 | Fernandez |
| 5,649,377 A | 7/1997 | Lobner |
| 5,709,453 A | 1/1998 | Krent et al. |
| 5,839,718 A | 11/1998 | Hase et al. |
| 6,028,291 A | 2/2000 | Heisler |
| 6,031,511 A | 2/2000 | DeLuca et al. |
| 6,037,573 A | 3/2000 | Arsenault et al. |
| 6,117,362 A | 9/2000 | Yen et al. |
| 6,294,990 B1 | 9/2001 | Knoll et al. |
| 6,419,854 B1 | 7/2002 | Yocom et al. |
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,347,576 B2 | 3/2008 | Wang et al. |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,638,874 B2 | 12/2009 | Chui et al. |
| 7,726,856 B2 | 6/2010 | Tsutsumi |
| 7,745,818 B2 | 6/2010 | Sofue et al. |
| 7,753,541 B2 | 7/2010 | Chen et al. |
| 7,830,267 B2 | 11/2010 | Veerasamy |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,118,441 B2 | 2/2012 | Hessling |
| 8,120,236 B2 | 2/2012 | Auday et al. |
| 8,136,425 B2 | 3/2012 | Bostick |
| 8,163,201 B2 | 4/2012 | Agrawal et al. |
| 8,169,131 B2 | 5/2012 | Murazaki et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,261,686 B2 | 9/2012 | Birman et al. |
| 8,286,378 B2 | 10/2012 | Martin et al. |
| 8,317,329 B2 | 11/2012 | Seder et al. |
| 8,317,359 B2 | 11/2012 | Harbers et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,459,832 B2 | 6/2013 | Kim |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,539,702 B2 | 9/2013 | Li et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,653,553 B2 | 2/2014 | Yamazaki et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,905,610 B2 | 12/2014 | Coleman et al. |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,059,378 B2 | 6/2015 | Verger et al. |
| 9,065,447 B2 | 6/2015 | Buttolo et al. |
| 9,067,530 B2 | 6/2015 | Bayersdorfer et al. |
| 9,187,034 B2 | 11/2015 | Tarahomi et al. |
| 9,299,887 B2 | 3/2016 | Lowenthal et al. |
| 9,315,148 B2 | 4/2016 | Schwenke et al. |
| 9,452,709 B2 | 9/2016 | Aburto Crespo |
| 9,568,659 B2 | 2/2017 | Verger et al. |
| 9,616,812 B2 | 4/2017 | Sawayanagi |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2005/0084229 A1 | 4/2005 | Babbitt et al. |
| 2005/0189795 A1 | 9/2005 | Roessler |
| 2005/0232469 A1* | 10/2005 | Schofield .......... G06K 9/00818 382/104 |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2007/0297045 A1 | 12/2007 | Sakai et al. |
| 2008/0205075 A1 | 8/2008 | Hikmet et al. |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2009/0312887 A1 | 12/2009 | Barry et al. |
| 2010/0102736 A1 | 4/2010 | Hessling |
| 2011/0012062 A1 | 1/2011 | Agrawal et al. |
| 2011/0265360 A1 | 11/2011 | Podd et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0209448 A1 | 8/2012 | Brower |
| 2012/0280528 A1 | 11/2012 | Dellock et al. |
| 2013/0050979 A1 | 2/2013 | Van De Ven et al. |
| 2013/0092965 A1 | 4/2013 | Kijima et al. |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0085488 A1 | 3/2015 | Grote, III et al. |
| 2015/0109602 A1 | 4/2015 | Martin et al. |
| 2015/0138789 A1 | 5/2015 | Singer et al. |

(56) References Cited

U.S. PATENT DOCUMENTS

| | | |
|---|---|---|
| 2015/0267881 A1 | 9/2015 | Salter et al. |
| 2015/0273986 A1* | 10/2015 | Benyahia ................. B60J 1/008 362/511 |
| 2015/0307033 A1 | 10/2015 | Preisler et al. |
| 2016/0016506 A1 | 1/2016 | Collins et al. |
| 2016/0052366 A1 | 2/2016 | Hoke et al. |
| 2016/0102819 A1 | 4/2016 | Misawa et al. |
| 2016/0131327 A1 | 5/2016 | Moon et al. |
| 2016/0236613 A1 | 8/2016 | Trier |
| 2016/0240794 A1 | 8/2016 | Yamada et al. |
| 2017/0043747 A1* | 2/2017 | Salter ..................... B60K 35/00 |
| 2017/0158125 A1 | 6/2017 | Schuett et al. |
| 2017/0253179 A1 | 9/2017 | Kumada |

FOREIGN PATENT DOCUMENTS

| | | |
|---|---|---|
| CN | 201193011 Y | 2/2009 |
| CN | 202200949 U | 4/2012 |
| CN | 204127823 U | 1/2015 |
| CN | 105102281 A | 11/2015 |
| CN | 205092987 * | 3/2016 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |
| WO | 2014161927 A1 | 10/2014 |

* cited by examiner

HEATED WINDSHIELD INDICATOR

FIELD OF THE INVENTION

The present invention generally relates to vehicle lighting, and more particularly, to lighting assemblies of a windshield.

BACKGROUND OF THE INVENTION

Nowadays, most vehicles have means for defrosting a windshield. Typically, when a defroster is turned on, an indicator provided inside the vehicle is illuminated to indicate the same.

SUMMARY OF THE INVENTION

According to one aspect of the present invention, a windshield assembly is provided. The windshield assembly includes a windshield and a heating element thermally coupled to the windshield. An indicator is thermally coupled to the windshield and has a light source for illuminating an icon indicating at least one of an activation state of the heating element and a relative temperature of the windshield.

According to another aspect of the present invention, a windshield assembly is provided. The windshield assembly includes a windshield having a frit and an indicator thermally coupled to the windshield to visually coincide with the frit and operable to illuminate in order to indicate a relative temperature of the windshield.

According to yet another aspect of the present invention, an indicator of a windshield is provided. The indicator includes a printed circuit board having a processor thermally coupled to the windshield. A light source is disposed on the printed circuit board for emitting light and an icon is illuminated by the light source to indicate a relative temperature of the windshield.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
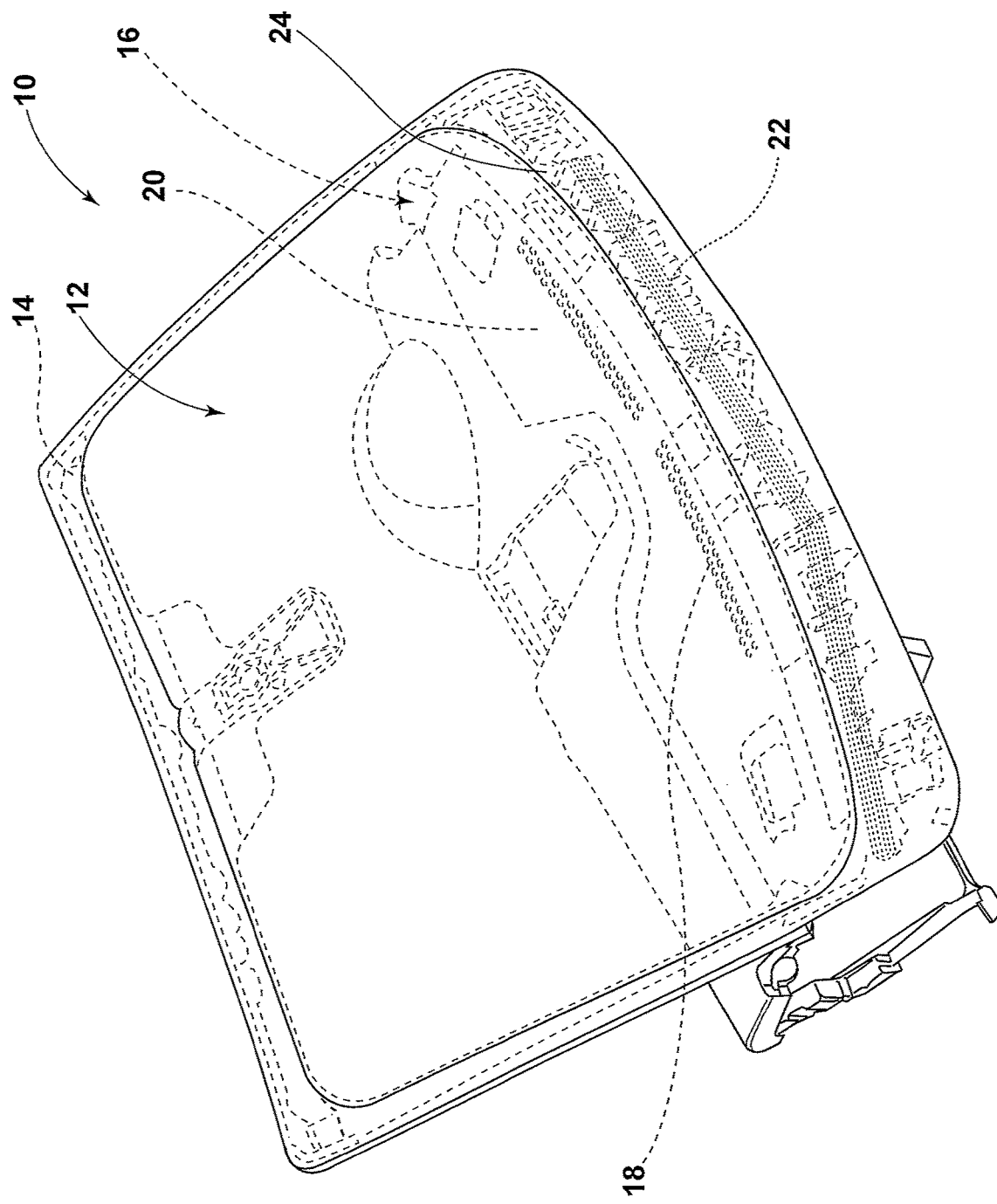
FIG. 1 is a front elevational view of a windshield assembly according to one embodiment.
Figure 2:
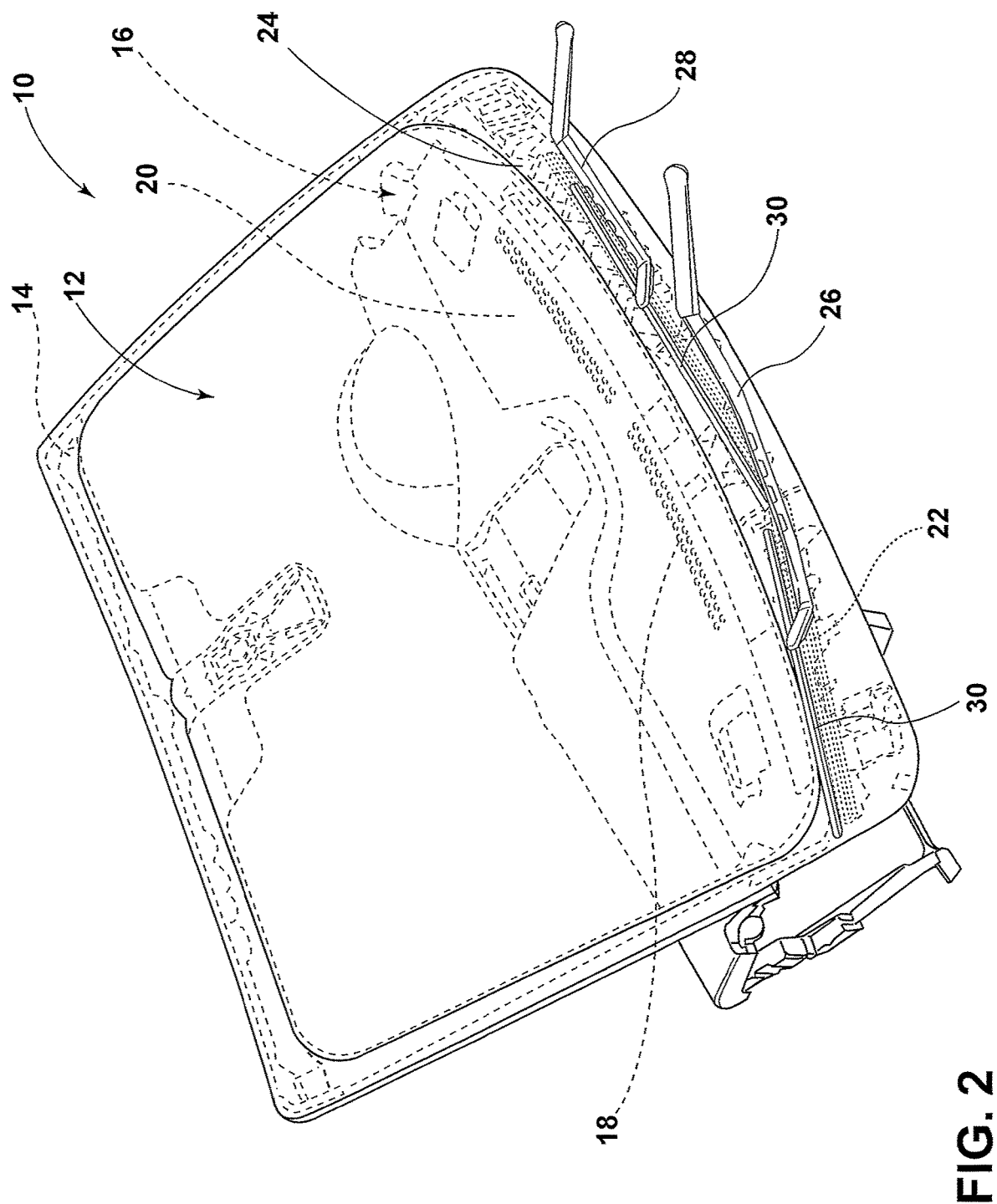
FIG. 2 illustrates the windshield assembly of FIG. 1 having a pair of windshield wipers parked at a lower portion of a windshield.

Referring to FIGS. 1 and 2, a front windshield assembly 10 of a vehicle is shown according to one embodiment. The front windshield assembly 10 includes a windshield 12, typically of glass construction, mounted to a windshield frame 14 by conventional means. As depicted in the present embodiment, the windshield 12 is disposed at an angle above a dashboard 16 having defroster ducts 18 defined in a top surface 20 of the dashboard 16. The defroster ducts 18 generally face the windshield 12 and may expel hot air in an effort to defrost the windshield 12. A heating element 22 is thermally coupled to a lower portion 24 of the windshield 12 and generally spans the length thereof. The heating element 22 may be embodied as a series of parallel linear resistive conductors provided on or in the windshield 12 and may receive power from a vehicle power supply to provide localized heating to the lower portion 24 of the windshield 12. Accordingly, the heating element 22 may function as a secondary defroster. As shown in FIG. 2, a pair of windshield wipers 26, 28 are disposed below the defroster ducts 18 such that their respective wiper blades 30 are parked against the lower portion 24 of the windshield 12. In operation, heat supplied from the heating element 22 may also serve to melt snow or ice that accumulates on the parked wiper blades 30.

Figure 3:
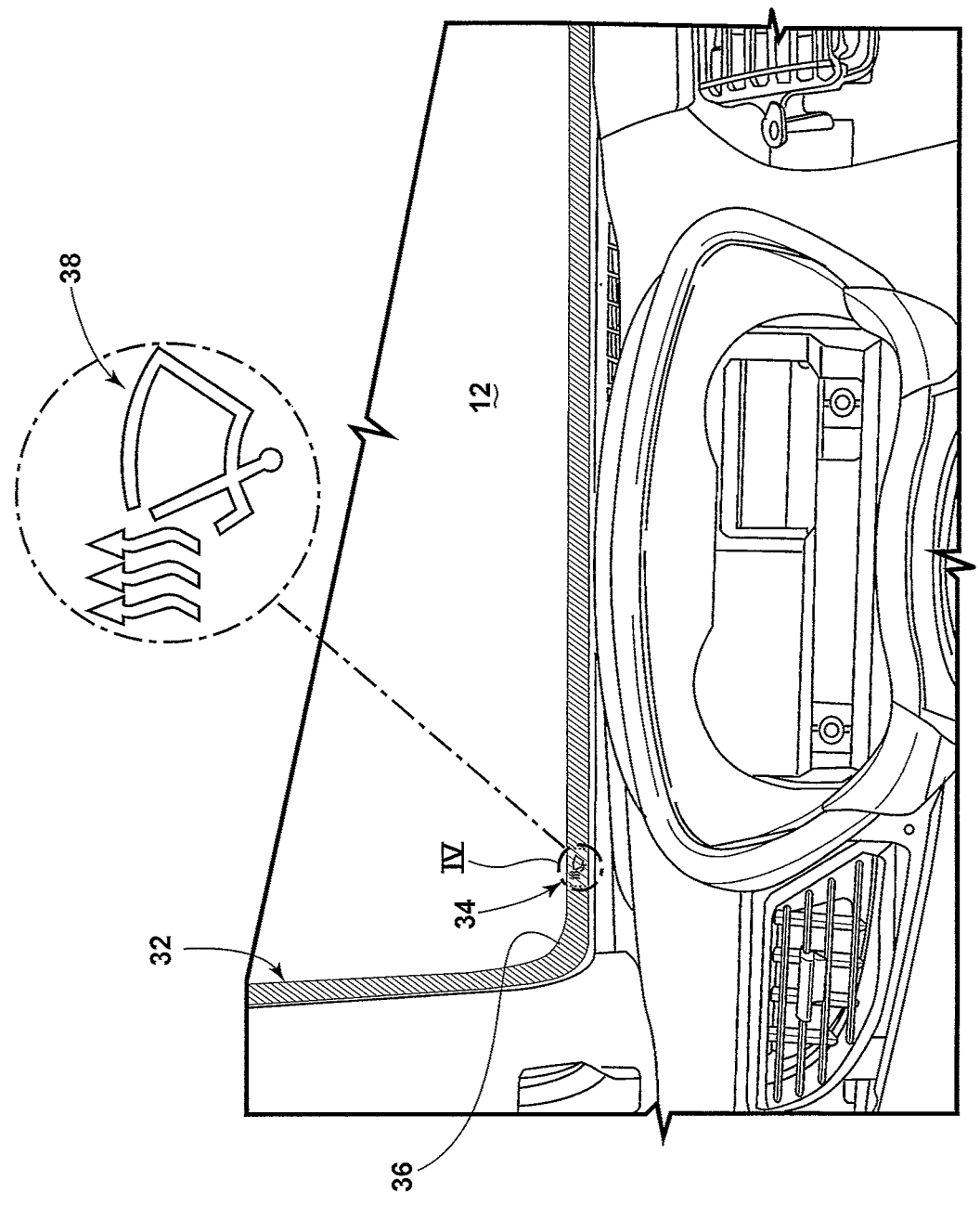
FIG. 3 illustrates an indicator visually coinciding with a frit of the windshield, the indicator configured to illuminate in order to indicate a relative temperature of the windshield.
Figure 4:
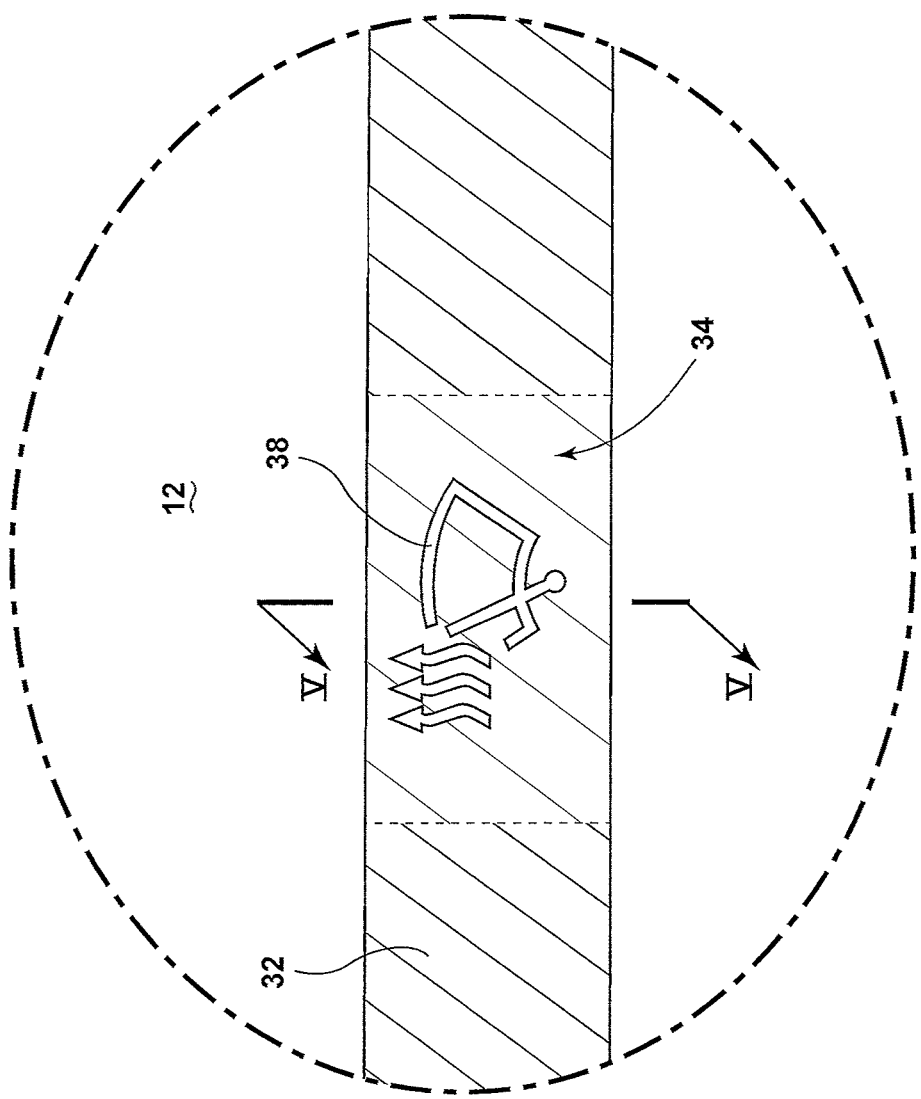
FIG. 4 is an enlarged view of area IV of FIG. 3.

Referring to FIGS. 3 and 4, the windshield 12 is shown from the vantage point of an occupant inside the vehicle. In the depicted embodiment, a frit 32 is coupled to the windshield 12 and is configured to border a periphery of thereof. The fit 32 is typically a black enamel band that provides an etched surface allowing adhesives to bond to the windshield 12 and generally serves as the contact point between the windshield 12 and the windshield frame 14. Aesthetically, the frit 32 conceals the adhesives used to install the windshield 12 and also provides shielding against ultraviolet (UV) radiation to protect the adhesive bond between the windshield 12 and the windshield frame 14. In the depicted embodiment, an indicator 34 is thermally coupled to a vehicle-inward side of the windshield 12 and is disposed to visually coincide with the frit 32. For example, the indicator 34 may visually coincide with the frit 32 proximate a lower corner portion 36 thereof on the driver side of the vehicle. By virtue of its location relative to the frit 32, the indicator 34 may be made to resemble the frit 32 when not in use, as will be described in greater detail herein. The indicator 34 may have a rectangular or square appearance when viewed head on from inside the vehicle. For purposes of illustration, the outline of the indicator 34 is exemplarily shown with dashed lining in FIG. 4. In operation, the indicator 34 is configured to sense a temperature of the windshield 12 and includes an icon 38, which is generally embodied as a front windshield defroster symbol that illuminates when the heating element 22 is activated through automatic or manual means. Like the heating element 22, the indicator 34 may also be powered by the vehicle power supply. According to one embodiment, illumination of the icon 38 indicates an activation state of the heating element 22. Additionally or alternatively, the indicator 34 may be configured such that illumination of the icon 38 indicates a relative temperature of the windshield 12.

Figure 5:
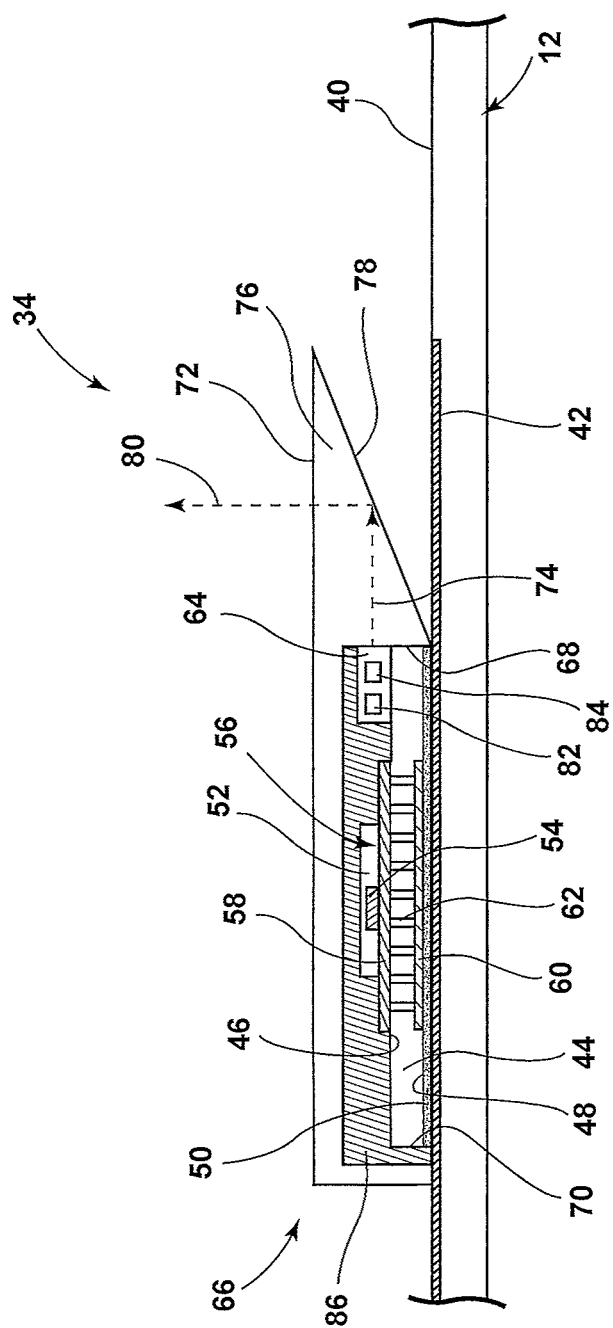
FIG. 5 is a cross-sectional view taken along line V-V of FIG. 4.

Referring to FIG. 5, a cross-sectional view of the indicator 34 is shown according to one embodiment. As shown, the indicator 34 is coupled to a vehicle-inward side 40 of the windshield 12 and visually coincides with a portion 42 of the frit 32. For purposes of illustration, portion 42 of the frit 32 is integrated in the windshield 12 but may be otherwise provided on side 40 of the windshield 12. Also, the windshield 12 is shown to be planar, but may be curved in other embodiments. In the depicted embodiment, the indicator 34 includes a printed circuit board (PCB) 44 that may be of an FR4 variety or configured as a flex circuit thereby enabling the PCB 44 to be contoured to the windshield 12. The PCB 44 includes a front side 46 and a rear side 48 that is affixed to side 40 of the windshield 12 using a thermally conductive adhesive 50. A processor 52 is provided on the front side 46 of the PCB 44 and includes a temperature sensor 54 that is thermally coupled to a thermal VIA structure 56 having a first pad 58 provided between the processor 52 and the front side 46 of the PCB 44 and a second pad 60 provided at the bottom side of the PCB 44 and thermally coupled to the adhesive 50, the first and second pads 58, 60 being connected by a plurality of barrels 62 extending through the PCB 44 from the front side 46 to the rear side 48. In this configuration, cooperation between the VIA structure 56 and the adhesive 50 enables the temperature sensor 54 of the processor 52 to sense a temperature of the windshield 12.

With continued reference to FIG. 5, the processor 52 drives a light source 64 provided at an upper portion of the front side 46 of the PCB 44. A light-transmissive cover 66 is disposed atop the PCB 44 and covers the front side 46, a top side 68, and a bottom side 70 of the PCB 44. The cover 66 includes a front side 72 on which the icon 38 is defined. For example, the cover 66 may be an overmold of optically clear silicone and the icon 38 may be molded into the silicone. Alternatively, the icon 38 may be defined using an opaque adhesive bonded to the front side 72 of the cover 66 or any other suitable means known in the art. In the depicted embodiment, the light source 64 is configured as a side emitter and emits light in a general upward direction as represented by dashed arrow 74. The cover 66 includes an optical member 76 extending past top side 68 of the PCB 44 and configured as a wedge defined by the front side 72 and a rear side 78 that extends at an upward incline relative the windshield 12. In this configuration, light emitted from the light source 64 is directed by the rear side 78 of the cover 66 toward the front side 72 on which the icon 38 is located as represented by dashed arrow 80. In alternative embodiments, the icon 38 may be directly backlit by the light source 64. In operation, the light source 64 illuminates the icon 38 to indicate at least one of an activation state of the heating element 22 and a relative temperature of the windshield 12. For example, the light source 64 may be activated in conjunction with the activation of the heating element 22 and indicate a relative temperature of the windshield 12 based on the color in which the icon 38 is illuminated.

In the depicted embodiment, the light source 64 may include a first light-emitting diode (LED) 82 configured to emit a visible light of a first color and a second LED 84 configured to emit visible light of a second color that is visually distinguishable from the first color. In one embodiment, the first LED 82 is a red-emitting LED and the second LED 84 is a green-emitting LED, each of which may be independently driven by the processor 52 via pulse-width modulation or direct current control. In order to indicate a relative temperature of the windshield 12, the first and second LEDs 82, 84 may be activated singly or in combination to illuminate the icon 38 in different colors, each indicating an associated temperature or temperature range of the windshield 12. For example, only the first LED 82 may be activated to illuminate the icon 38 in a red color whenever the temperature sensor 54 of the processor 52 registers a windshield temperature of 25 degrees Fahrenheit or less. As the windshield temperature increases due to heating from heating element 22, the first and second LEDs 82, 84 may be jointly activated to effectuate various hues of red, green, and mixtures thereof, including yellow. Once the windshield temperature reaches 50 degrees Fahrenheit or more, only the second LED 84 may remain activated. Thus, in the embodiment described above, the color green can be associated with a cold windshield temperature, the color yellow can be associated with a warm windshield temperature, and the color red can be associated with a hot windshield temperature. Accordingly, by independently controlling the first and second LEDs 82, 84 to effectuate different colored illumination of the icon 38, the indicator 34 is able to visually relate color to a relative temperature of the windshield 12. Furthermore, an occupant is able to track the relative temperature of the windshield 12 based on the color in which the icon 38 is illuminated. In operating the first and second LEDs 82, 84, the processor 52 may use lookup tables and uses temperature limits well within calibrated sensor limits of the temperature sensor 54 to ensure that the illumination of the icon 38 can progress from red to green based on the relative temperature of the windshield 12 as dictated by the heating element 22.

To conceal the indicator 34 a black solder mask 86 may be overlaid on top of the PCB 44, the processor 52, and the light source 64, thereby imparting a like appearance to the indicator 34 as the frit 32. In alternative embodiments, a pad printing process may be employed such that the cover 66 is opaque and blackened out except for portions thereof defining the icon 38. In either embodiment, when the indicator 34 is viewed head on from inside the vehicle, it will resemble the frit 32 and only the icon 38 will be observable when illuminated.

Figure 6:
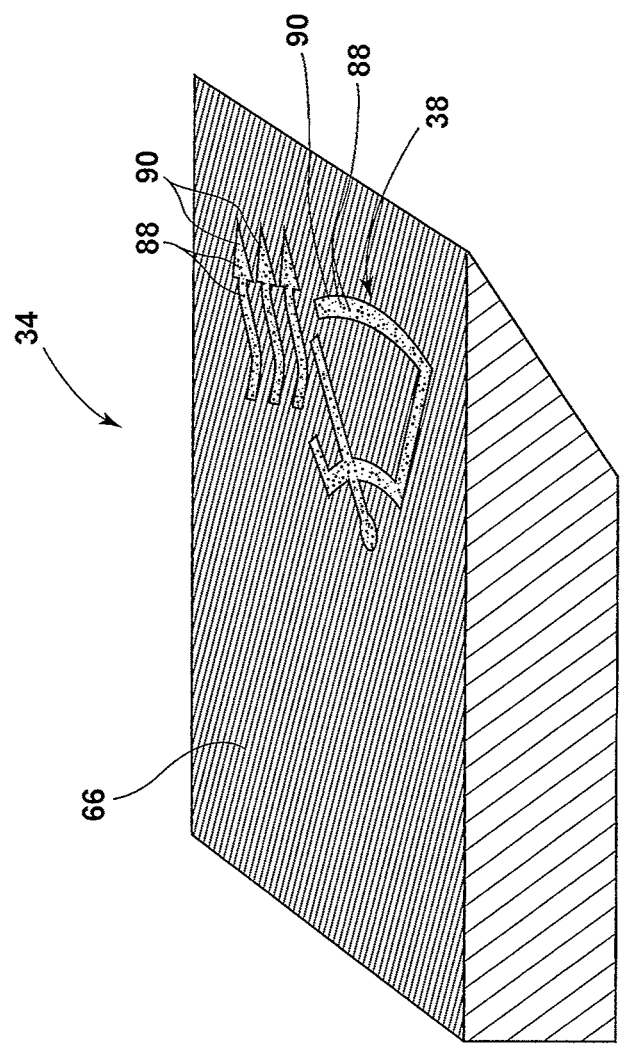
FIG. 6 is a side perspective view of the indicator according to one embodiment.

Referring to FIG. 6, another embodiment of the indicator 34 is shown and is similar in construction to that shown in FIG. 5. In the depicted embodiment, the icon 38 is defined via a pad printing process and portions of the cover 66 defining the icon 38 include one or more photoluminescent materials embedded therein or otherwise coupled thereto. For example, a first photoluminescent material 88 may be provided and is configured to luminesce in a first visible color in response to excitation light from one of the first and second LEDs 82, 84. Additionally, a second photoluminescent material 90 is provided and is configured to luminesce in a second visible color, visually distinguishable from the first visible color, in response to excitation light from the other of the first and second LEDs 82, 84. In one embodiment, the first photoluminescent material 88 is red-emitting and the second photoluminescent material 90 is green-emitting while the first LED 82 emits UV light and the second LED 84 emits blue light. In such a configuration, the processor 52 may operate the first and second LEDs 82, 84 in the same manner as described above with reference to FIG. 5 to effectuate luminescence of the icon 38 in a red color, a green color, or a mixture thereof. With respect to the embodiments described with reference to FIGS. 5 and 6, the light source 64 may include a single LED in alternative embodiments, wherein the relative temperature of the windshield 12 is instead indicated by an intensity level in which the icon 38 is illuminated.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A windshield assembly comprising:
   a heating element thermally coupled to a windshield;
   an indicator thermally coupled to the windshield and having a light source for illuminating an icon indicating at least one of an activation state of the heating element and a relative temperature of the windshield; and
   an optical member positioned on the windshield and configured to redirect emitted light from the light source into an interior of a vehicle.

2. The windshield assembly of claim 1, wherein the indicator comprises a printed circuit board having a processor in thermal communication with a thermal VIA structure coupled to the printed circuit board.

3. The windshield assembly of claim 2, wherein the printed circuit board is coupled to the windshield by a thermally conductive adhesive in thermal communication with the thermal VIA structure.

4. The windshield assembly of claim 3, wherein the icon is light-transmissive and is defined in a cover disposed atop the printed circuit board.

5. The windshield assembly of claim 4, wherein the light source is provided on the printed circuit board and is configured as a side emitter, and wherein the cover comprises the optical member configured to direct light emitted from the light source toward the icon.

6. The windshield assembly of claim 1, wherein the light source comprises a first light-emitting diode configured to emit light of a first visible color and a second light-emitting diode configured to emit light of a second visible color that is visually distinguishable from the first visible color, and wherein the relative temperature of the windshield is based on the icon illuminating in the first visible color, the second visible color, or a combination thereof.

7. The windshield assembly of claim 1, further comprising a photoluminescent structure coupled to the icon and configured to luminesce in response to light excitation provided by the light source.

8. A windshield assembly comprising:
   a windshield having a frit;
   an indicator thermally coupled to the windshield to visually coincide with the frit and operable to illuminate in order to indicate a relative temperature of the windshield; and
   a temperature sensor thermally coupled to a thermal VIA structure having a first pad coupled to a first side of a printed circuit board and a second pad coupled to a second side of the printed circuit board and separated from the first pad by one or more barrels.

9. The windshield assembly of claim 8, wherein the printed circuit board has a processor in thermal communication with the thermal VIA structure coupled to the printed circuit board.

10. The windshield assembly of claim 9, wherein the printed circuit board is coupled to the windshield by a thermally conductive adhesive in thermal communication with the thermal VIA structure.

11. The windshield assembly of claim 8, wherein the indicator comprises a light-transmissive icon and a light source provided for illuminating the icon.

12. The windshield assembly of claim 11, wherein the light source is provided on the printed circuit board and is configured as a side emitter, and further comprising an optical member configured to direct light emitted from the light source toward the icon.

13. The windshield assembly of claim 11, wherein the light source comprises a first light-emitting diode configured to emit light of a first visible color and a second light-emitting diode configured to emit light of a second visible color that is visually distinguishable from the first visible color, and wherein the relative temperature of the windshield is based on the icon illuminating in the first visible color, the second visible color, or a combination thereof.

14. The windshield assembly of claim 8, wherein the indicator is operated in conjunction with a heating element configured to defrost the windshield.

15. A vehicle indicator, comprising:
   a printed circuit board having a processor coupled to a windshield by an adhesive covering a first side of the printed circuit board;
   a light source disposed on the printed circuit board;
   an icon illuminated by the light source to indicate a relative temperature of the windshield; and
   a solder mask positioned on a second side opposing the first side and a third side therebetween of the printed circuit board.

16. The indicator of claim 15, further comprising a thermal VIA structure coupled to the printed circuit board and in thermal communication with the processor.

17. The indicator of claim 16, wherein the adhesive is thermally conductive and the printed circuit board is in thermal communication with the thermal VIA structure.

18. The indicator of claim 15, wherein the light source is provided on the printed circuit board and is configured as a side emitter, and further comprising an optical member configured to direct light emitted from the light source toward the icon.

19. The indicator of claim 15, wherein the light source comprises a first light-emitting diode configured to emit light of a first visible color and a second light-emitting diode configured to emit light of a second visible color that is visually distinguishable from the first visible color, and wherein the relative temperature of the windshield is based on the icon illuminating in the first visible color, the second visible color, or a combination thereof.

20. The indicator of claim 15, disposed to visually coincide with a frit of the windshield.

* * * * *